United States Patent [19]
Masato

[11] Patent Number: 5,883,506
[45] Date of Patent: Mar. 16, 1999

[54] POWER SUPPLY WITH VOLTAGE STABILIZING CONTROL CIRCUIT

[75] Inventor: Tsuyoshi Masato, Kanagawa, Japan

[73] Assignee: Sony Corporation, Tokyo, Japan

[21] Appl. No.: 915,396

[22] Filed: Aug. 20, 1997

[30] Foreign Application Priority Data

Aug. 29, 1996 [JP] Japan .................................. 8-228804

[51] Int. Cl.⁶ ........................................................ G05F 1/12
[52] U.S. Cl. .......................................... 323/297; 323/222
[58] Field of Search .................................. 323/222, 268, 323/297

*Primary Examiner*—Shawn Riley
*Attorney, Agent, or Firm*—Jay H. Maioli

[57] ABSTRACT

An arbitrary input AC voltage is applied from an external power supply (1) to a rectifying circuit (2), and one rectifying output end of the rectifying circuit is connected to a switching element (4) through a coil (3), while the other rectifying output end of the rectifying circuit is connected to a common terminal of the switching element through a detecting circuit (5) for a current waveform. Further, a peak value wave detecting circuit formed of a diode (6) and a capacitor (7) is connected in parallel with the switching element (4) so that a step-up chopper circuit is formed. A detecting circuit (10) for an output voltage having two resistors (9a), (9b) is connected between both ends of this capacitor (7). The one rectifying output end of the rectifying circuit (2) is connected to a detecting circuit (11) for an effective voltage value, and the two resistors (9a), (9b) for detecting the output voltage of the detecting circuit (10) are selected by a detecting signal of the detecting circuit (11). The detecting signals of these detecting circuits (5), (10), (11) are supplied to a control block (12) for controlling turning-on and turning-off timings of the switching element (4).

6 Claims, 3 Drawing Sheets

| | Input AC [V] | Output DC [V] | Input Power Pin [W] | Output Voltage Pout [W] | Loss [V] | Defference in loss [W] |
|---|---|---|---|---|---|---|
| A | 100 | 262 | 318.5 | 288.2 | 30.3 | — |
| B | 100 | 359 | 347.5 | 290.8 | 56.7 | 26.4 |
| C | 230 | 361 | 329.5 | 292.4 | 37.1 | 6.8 |
| D | 100 | 257 | 328.5 | 287.8 | 40.7 | 10.4 |

5,883,506

POWER SUPPLY WITH VOLTAGE STABILIZING CONTROL CIRCUIT

BACKGROUND OF THE INVENTION

1. Field of the Invention

The present invention relates to a power supply circuit suitably used in e.g., a display monitor device.

2. Description of the Related Art

For example, a power supply circuit used in a display monitor device is connected to various kinds of external power supplies from a low voltage of about 100 V to a high voltage of about 220 V. In the power supply circuit, the voltages applied from the connected power supplies are rectified and rectified outputs are applied to a voltage converting circuit (DC—DC converter) so as to obtain a desirable stabilized voltage to be applied to a load.

Use of a step-up chopper circuit for reducing higher harmonic wave current noises and improving power factor is considered in such a power supply circuit. Namely, it is widely known that such a step-up chopper circuit is effective so as to reduce the higher harmonic wave current noises and improve the power factor.

FIG. 1 shows one example of the conventional power supply circuit using a step-up chopper circuit. In FIG. 1, for example, an arbitrary input AC voltage from a low voltage of about 100 V to a high voltage of about 220 V is applied from an external power supply 21 to a rectifying circuit 22. A rectified output of full-wave rectification or half-wave rectification is obtained from both ends of this rectifying circuit 22.

One rectifying output end of the rectifying circuit 22 is connected to a switching element 24 through a coil 23. The other rectifying output end of the rectifying circuit 22 is connected to a common terminal of the switching element 24 through a current waveform detecting circuit 25. Further, a peak value detecting circuit formed of a diode 26 and a capacitor 27 is arranged in parallel with the switching element 24 so that the step-up chopper circuit is formed.

Accordingly, in this power supply circuit, since the above switching element 24 is turned on and off with an arbitrary timing, a voltage boosted in comparison with the rectified output is obtained from the coil 23 instantaneously when the switching element 24 is turned off. A peak value of this output voltage is provided to the capacitor 27. An output DC voltage obtained across both ends of the capacitor 27 is applied to a DC—DC converter 28.

Further, a detecting circuit 30 for an output voltage having a resistor 29 is connected between both ends of the above capacitor 27. The one rectifying output end of the rectifying circuit 22 is connected to a detecting circuit 31 for an effective voltage value. Detecting signals from these detecting circuits 30, 31 and a detecting signal from the above detecting circuit 25 for a current waveform are supplied to a control block 32 for controlling turning-on and turning-off timings of the switching element 24.

For example, loads 33 and 34 are circuits of respective portions of a display monitor device to which a driving voltage from the DC—DC converter 28 is supplied. For example, a standby power supply circuit 35 is used to apply a predetermined standby power to the control block 32 even in a state in which the power supply of the entire device is turned off.

In the above power supply circuit, for example, the turning-on and turning-off timings of the switching element 24 are controlled such that an output DC voltage obtained across both the ends of the capacitor 27 becomes to a predetermined value. Namely, in the above power supply circuit, a boosting voltage ratio is changed by varying an on-off duty of the switching element 24 so that a value of the output DC voltage can be varied.

Therefore, the on-off duty cycle of the switching element 24 is varied by the control block 32 so as to obtain a predetermined output DC voltage with respect to a detecting signal from the above detecting circuit 31 for an effective voltage value. Further, the on-off duty cycle of the switching element 24 is adjusted by the control block 32 by using a detecting signal from the detecting circuit 30 for an output voltage such that this output voltage becomes a desirable value.

Thus, the output DC voltage obtained between both the ends of the capacitor 27 can be adjusted to a predetermined value. In this case, for example, various kinds of applied voltages from a low voltage of about 100 V to a high voltage of about 220 V can be boosted to a fixed output DC voltage of, for example, 360 V. Thus, the monitor device can be stably operated even when any power supply is connected as the external power supply 21.

In accordance with this power supply circuit, the higher harmonic wave current noises are reduced and the power factor is improved by using the step-up chopper circuit so that a preferable power supply circuit can be formed.

However, for example, when the above power supply circuit is mounted to a display monitor device having a maximum consumed power of about 450 W and a power loss is measured, it has been found in this power supply circuit that the power loss is greatly changed in accordance with an input AC voltage as shown in the table of FIG. 2.

Namely, for example, A in FIG. 2 shows a reference value of the power loss when the power supply circuit is formed by double voltage rectification and a capacitor input system without using the step-up chopper circuit. When the input AC voltage is 100 V, the output DC voltage is 262 V. In this case, an output power Pout is 288.2 W when an input power Pin is 318.5 W. Accordingly, a power loss of 30.3 W is caused.

In contrast to this, B and C in FIG. 2 show cases in which the above step-up chopper circuit is used. When the input AC voltage is 100 V (B in FIG. 2), the output DC voltage is 359 V. In this case, the output power Pout is 290.8 W when the input power Pin is 347.5 W. Accordingly, a power loss of 56.7 W is caused. This case shows an increase in loss of 26.4 W in comparison with the case of A in this table.

When the input AC voltage is 230 V (C in FIG. 2), the output DC voltage is 361 V. In this case, the output power Pout is 292.4 W when the input power Pin is 329.5 W. Accordingly, a power loss of 37.1 W is caused. This case shows an increase in loss of 6.8 W in comparison with the case of A in the table.

Thus, in the power supply circuit using the above step-up chopper circuit, a great increase in power loss is caused particularly when the input AC voltage is low. Namely, such a loss is caused by using the step-up chopper circuit when a voltage (solid line) and an electric current (broken line) are formed as shown in, FIG. 3 by turning on and off the switching element 24 and both this voltage and this electric current are not zero.

As mentioned above, for example, when 100 V as an input AC voltage is boosted up to 359 V as an output DC voltage, a boosting voltage ratio is large so that a fall period of the electric current applied to the switching element 24 is made long. Therefore, the power loss caused in this period is increased.

Accordingly, in the case of such an increase in loss, this loss is changed to heat generation in the switching element 24, etc. so that it is necessary to arrange a strong cooling device, etc. for removing this generated heat. When the above output DC voltage is set to be low in accordance with a low input AC voltage, there is a fear that no step-up chopper circuit is operated when a high input AC voltage is supplied.

SUMMARY OF THE INVENTION

In consideration of such points, the problems to be solved by the present invention are that a great increase in power loss is caused in the power supply circuit using the step-up chopper circuit for reducing higher harmonic wave current noises and improving power factor as mentioned above when the input AC voltage is particularly low.

Therefore, in the present invention, the level of a voltage supplied to a voltage converting circuit is switched in accordance with an effective voltage value of a rectified output so that an increase in power loss can be reduced even when an input AC voltage is low.

According to an aspect of the present invention, a power supply circuit connected with various kinds of power supplies from a low voltage to a high voltage and producing a stabilized output voltage includes a rectifying means for rectifying a voltage of a connected power supply, a step-up chopper circuit for boosting a rectified output of the rectifying means, a voltage detecting means for applying an output voltage of the step-up chopper circuit to a voltage converting circuit and detecting the output voltage of the step-up chopper circuit, a voltage stabilizing control means for controlling the output voltage of the chopper circuit by a detected output of the voltage detecting means, a discriminating means for discriminating an effective voltage value of the rectified output of the rectifying means, and a voltage switching means for switching a level of a voltage applied to the voltage converting circuit in accordance with a discriminated result of the discriminating means.

DESCRIPTION OF THE PREFERRED EMBODIMENT

Figure 4:
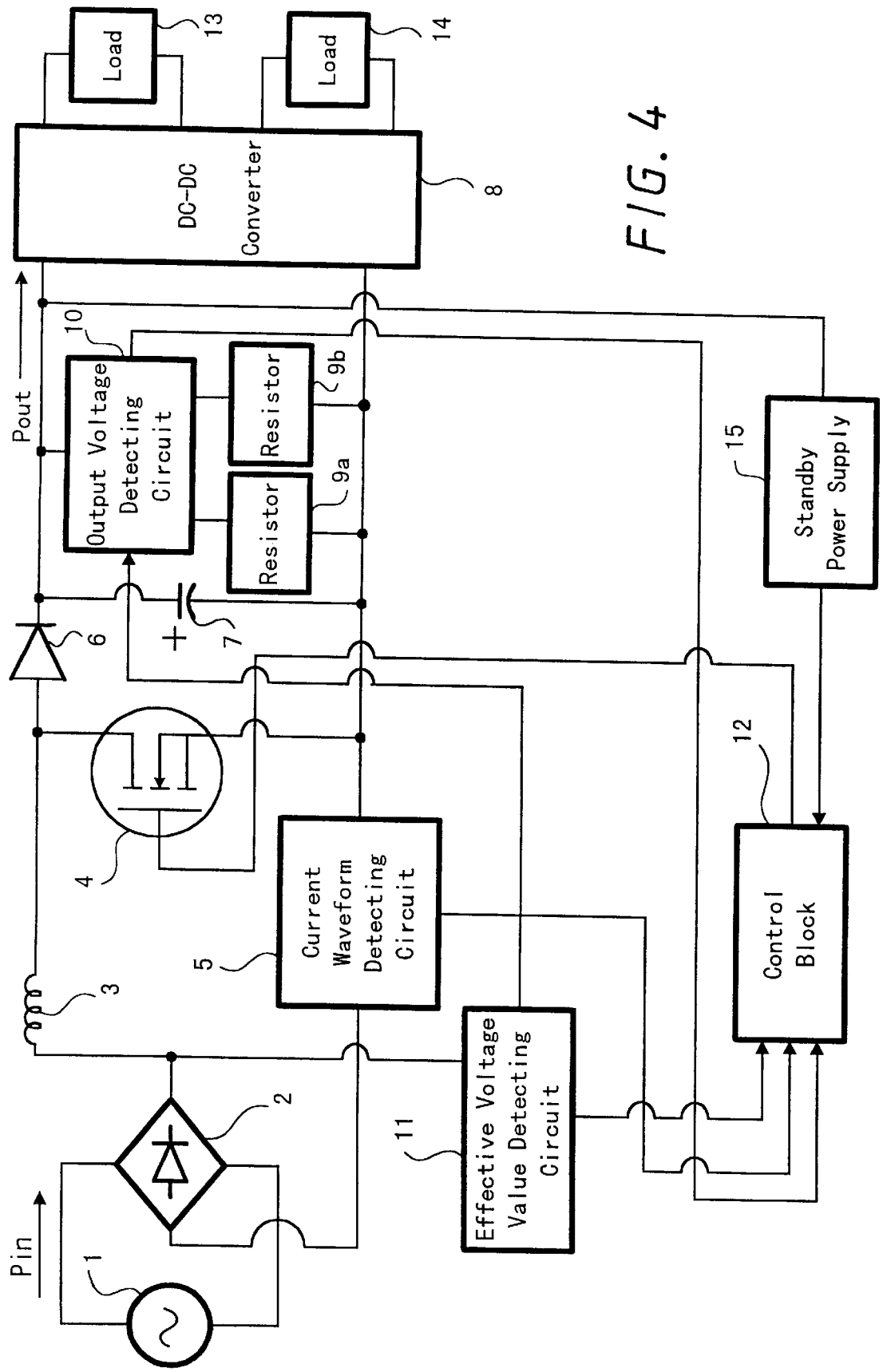
FIG. 4 is a block diagram showing an arrangement of one example of a power supply circuit according to the present.

The present invention will next be described with reference to the drawings. FIG. 4 is a block diagram showing the construction of one example of a power supply circuit to which the present invention is applied. In FIG. 4, for example, an arbitrary input AC voltage from a low voltage of about 100 V to a high voltage of about 220 V is applied from an external power supply 1 to a rectifying circuit 2. A rectified output of full-wave rectification or half-wave rectification is obtained from both ends of the rectifying circuit 2.

One rectifying output end of the rectifying circuit 2 is connected to a switching element 4 through a coil 3. The other rectifying output end of the rectifying circuit 2 is connected to a common terminal of the switching element 4 through a current waveform detecting circuit 5. Further, a peak value wave detecting circuit formed of a diode 6 and a capacitor 7 is connected in parallel with the switching element 4 so that a step-up chopper circuit is formed.

Accordingly, the above switching element 4 is turned on and off in an arbitrary timing in the above power supply circuit. Thus, a voltage boosted in comparison with the rectified output is taken out of the coil 3 instantaneously when the switching element 4 is turned off. A peak value of the output voltage is provided to the capacitor 7. An output DC voltage obtained across both ends of the capacitor 7 is supplied to a DC—DC converter 8.

Further, a detecting circuit 10 for an output voltage having resistors 9a, 9b is connected between both the ends of the above capacitor 7. The one rectifying output end of the rectifying circuit 2 is connected to a detecting circuit 11 for an effective voltage value. Further, a detecting signal from this detecting circuit 11 is supplied to the detecting circuit 10 and the resistors 9a, 9b used in detection of the output voltage are selected.

Detecting signals from these detecting circuits 10, 11 and a detecting signal from the above detecting circuit 5 for a current waveform are supplied to a control block 12 for controlling turning-on and turning-off timings of the switching element 4.

For example, loads 13 and 14 are circuits of respective portions of a display monitor device to which a driving voltage from the DC—DC converter 8 is applied. For example, a standby power supply circuit 15 applies a predetermined standby power to the control block 12 even in a state in which the power supply of the entire device is turned off.

For example, an operation of this power supply circuit is controlled such that each output DC voltage obtained between both the ends of the capacitor 7 is set to a predetermined value with respect to the detecting signal from the above detecting circuit 11 for an effective voltage value. Namely, the power supply circuit is set such that a detecting signal providing the same value is obtained with respect to each of values of the output DC voltage by selecting the resistors 9a, 9b of the above detecting circuit 10 with respect to the detecting signal from the detecting circuit 11.

Further, an on-off duty cycle of the switching element 4 is varied by the control block 12 so as to obtain each predetermined output DC voltage with respect to the detecting signal from the above detecting circuit 11. The on-off duty cycle of the switching element 4 is adjusted by the control block 12 by using the detecting signal from the detecting circuit 10 for an output voltage such that the output voltage is set to a desirable value.

Namely, for example, the power supply circuit is adjusted such that the output DC voltage becomes to 260 V when an input AC voltage is 100 to 150 V. The power supply circuit is also adjusted such that the output DC voltage becomes equal to 360 V when the input AC voltage is 150 to 240 V. Thus, the above boosting voltage ratio is reduced and a fall period of an electric current supplied to the switching element 4 is shortened so that power loss caused in this period is reduced.

Figure 1:
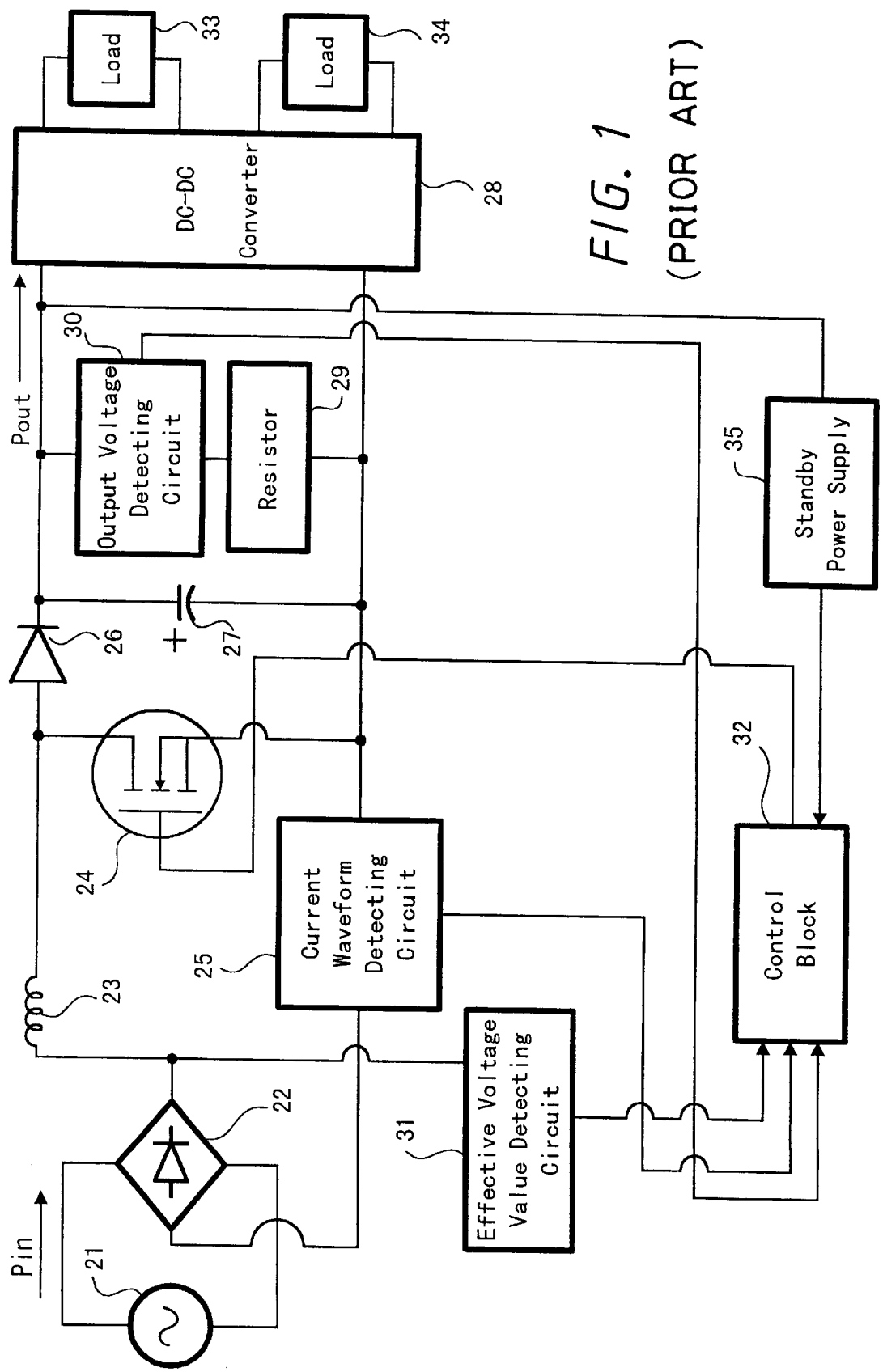
FIG. 1 is a block diagram showing an arrangement of a conventional power supply circuit.
Figures 2, 3:
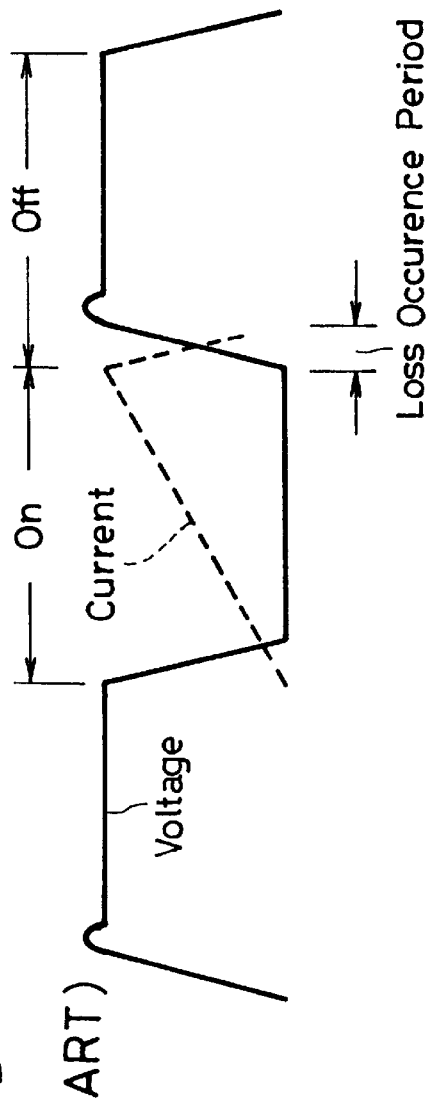
FIG. 2 is a table used for explaining the conventional power supply circuit.
FIG. 3 is a waveform diagram used for explaining the conventional power supply circuit.

In this case, for example, when the power supply circuit is mounted to the above display monitor device having about 450 W in maximum consumed power and the power loss is measured, the measured results are shown in the above table of FIG. 3. As shown in D in this table, the output DC voltage is 257 V when the input AC voltage is 100 V. At this time, output power Pout is 287.8 W when input power Pin is 328.5

W. Accordingly, a power loss of 40.7 W is caused. This power loss is restrained to an increase in loss of 10.4 W in comparison with A in this table.

For example, the DC—DC converter 8 provides a stable output voltage with respect to an input voltage including fluctuations. When the input voltage thereto is approximately set to range from about 260 V to 360 V, a stable driving voltage can be applied from the DC—DC converter 8 to the loads 13, 14.

Thus, the device can be stably operated even when any power supply, such as the external power supply 1, is connected to the power supply circuit. In accordance with the power supply circuit, higher harmonic wave current noises are reduced and power factor is improved by using the step-up chopper circuit so that a preferable power supply circuit can be formed.

Accordingly, in the power supply circuit, an increase in power loss can be reduced by switching the level of a voltage applied to the voltage converting circuit in accordance with an effective voltage value of the rectified output even when the input AC voltage is low. Further, it is possible to remove a fear that the step-up chopper circuit is not operated when a high input AC voltage is applied to the power supply circuit.

In the conventional power supply circuit using the step-up chopper circuit for reducing the higher harmonic wave current noises and improving the power factor, the increase in power loss is greatly caused particularly when the input AC voltage is low. However, in accordance with the present invention, the increase in power loss can be reduced even when the input AC voltage is low.

For example, heat generation in the switching element is reduced by reducing the loss in this way, and a burden to a cooling device, etc. for removing this generated heat can be reduced so that the entire device can be made compact and light in weight. Further, operating efficiency of the entire device can be improved.

For example, when a resonance type circuit is used as the DC—DC converter, output power (load) of the circuit is constant at any time with respect to its burden. In consideration of these contents, loss is increased when an output voltage of the step-up chopper circuit is increased. The above-mentioned invention also acts as a plus with respect to this point.

Thus, the above-mentioned power supply circuit is connected with various kinds of power supplies from a low voltage to a high voltage and produces a stabilized output voltage. The power supplying circuit comprises a rectifying means for rectifying the voltage of a connected power supply; a voltage stabilizing control means for applying a rectified output from the rectifying means to a voltage converting circuit through a step-up chopper circuit and controlling an operation of the step-up chopper circuit by detecting a voltage applied to the voltage converting circuit; a discriminating means for discriminating an effective voltage value of the rectified output of the rectifying means; and a voltage switching means for switching the level of the voltage applied to the voltage converting circuit in accordance with the discriminated results of this discriminating means. Accordingly, an increase in power loss can be reduced even when an input AC voltage is low.

In accordance with the present invention, the increase in power loss can be reduced by switching the levels of a voltage supplied to the voltage converting circuit in accordance with an effective voltage value of a rectified output even when the input AC voltage is low. Further, it is possible to remove a fear that the step-up chopper circuit is not operated when a high input AC voltage is supplied to the power supply circuit.

In the conventional power supply circuit using the step-up chopper circuit for reducing higher harmonic wave current noises and improving power factor, the increase in power loss is greatly caused particularly when the input AC voltage is low. However, in accordance with the present invention, the increase in power loss can be also reduced even when the input AC voltage is low.

For example, heat generation in the switching element is reduced by reducing the loss in this way, and a burden to a cooling device, etc. for removing the heat generated can be reduced so that the entire device can be made compact and light in weight. Further, operating efficiency of the entire device can be improved.

Having described preferred a embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A power supply circuit for use with a voltage converting circuit and for connection to an external power supply, said power supply circuit producing a stabilized output voltage and comprising:

rectifying means for rectifying a voltage of said external power supply connected thereto and producing a rectified output;

a step-up chopper circuit for boosting said rectified output of said rectifying means;

voltage detecting means for applying a boosted output voltage of said step-up chopper circuit to said voltage converting circuit and detecting the boosted output voltage of said step-up chopper circuit;

voltage stabilizing control means for controlling the boosted output voltage of said step-up chopper circuit in response to a detected output of said voltage detecting means;

discriminating means for discriminating an effective voltage value of the rectified output of said rectifying means; and switching means for switching a level of the boosted output voltage applied to said voltage converting circuit in accordance with a discriminated output of said discriminating means, wherein said voltage detecting means and said voltage switching means are combined as a single device.

2. A power supply circuit for use with a voltage converting circuit and for connection to an external power supply, said power supply circuit producing a stabilized output voltage and comprising:

rectifying means for rectifying a voltage of said external power supply connected thereto and producing a rectified output;

a step-up chopper circuit for boosting said rectified output of said rectifying means;

voltage detecting means for applying a boosted output voltage of said step-up chopper circuit to said voltage converting circuit and detecting the boosted output voltage of said step-up chopper circuit;

voltage stabilizing control means for controlling the boosted output voltage of said step-up chopper circuit in response to a detected output of said voltage detecting means;

discriminating means for discriminating an effective voltage value of the rectified output of said rectifying means; and switching means for switching a level of the boosted output voltage applied to said voltage converting circuit in accordance with a discriminated output of said discriminating means, wherein said voltage detecting means and said voltage switching means are combined as a single device and, wherein said voltage switching means includes two resistors and said voltage switching means switches the levels of said boosted output voltage by switching between said two resistors.

3. The power supply circuit as claimed in claim 1 wherein said voltage converting circuit comprises a DC—DC converter.

4. The power supply circuit as claimed in claim 3, wherein an output voltage from said DC—DC converter is applied to a display monitor.

5. The power supply circuit as claimed in claim 2 wherein said voltage converting circuit comprises a DC—DC convertor.

6. The power supply circuit as claimed in claim 5, wherein an output voltage from said DC—DC converter is applied to a display monitor.

* * * * *